(12) United States Patent
Tohara et al.

(10) Patent No.: US 9,211,785 B2
(45) Date of Patent: Dec. 15, 2015

(54) EXHAUST PIPE STRUCTURE OF HYBRID VEHICLE

(71) Applicant: MITSUBISHI JIDOSHA KOGYO KABUSHIKI KAISHA, Tokyo (JP)

(72) Inventors: Kenta Tohara, Tokyo (JP); Toshimasa Tanaka, Tokyo (JP); Kentaro Tanaka, Tokyo (JP); Yasuhiko Noguchi, Tokyo (JP)

(73) Assignee: MITSUBISHI JIDOSHA KOGYO KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/265,430

(22) Filed: Apr. 30, 2014

(65) Prior Publication Data

US 2014/0231158 A1 Aug. 21, 2014

Related U.S. Application Data

(63) Continuation of application No. PCT/JP2012/078373, filed on Nov. 1, 2012.

(30) Foreign Application Priority Data

Nov. 4, 2011 (JP) ................................. 2011-242623

(51) Int. Cl.
| | |
|---|---|
| *B60K 6/40* | (2007.10) |
| *B60K 1/04* | (2006.01) |
| *B60K 13/04* | (2006.01) |
| *F01N 13/08* | (2010.01) |
| *F01N 13/18* | (2010.01) |
| *F01N 3/10* | (2006.01) |

(52) U.S. Cl.
CPC ... *B60K 6/40* (2013.01); *B60K 1/04* (2013.01); *B60K 13/04* (2013.01); *F01N 3/101* (2013.01);

(Continued)

(58) Field of Classification Search
CPC .............................. B60K 6/40; Y10S 903/904
USPC ........................................ 180/65.21; 903/904
See application file for complete search history.

(56) References Cited

U.S. PATENT DOCUMENTS

| | | | |
|---|---|---|---|
| 2002/0157897 A1 | 10/2002 | Hofmann et al. | |
| 2008/0057393 A1* | 3/2008 | Onuki et al. | 429/159 |

(Continued)

FOREIGN PATENT DOCUMENTS

| | | |
|---|---|---|
| EP | 1270890 A2 | 1/2003 |
| EP | 1329606 A2 | 7/2003 |

(Continued)

OTHER PUBLICATIONS

Japanese Office Action mailed Nov. 4, 2014 issued in corresponding Japanese Application No. 2013-541844 with an English translation.

*Primary Examiner* — Brodie Follman
*Assistant Examiner* — Brian Cassidy
(74) *Attorney, Agent, or Firm* — Birch, Stewart, Kolasch & Birch, LLP (57) ABSTRACT

An exhaust pipe structure for a hybrid vehicle includes an exhaust pipe, which includes bent portions and is connected to an internal combustion engine. The exhaust pipe includes a front-rear direction extended part, a catalytic part, and a joint part. The front-rear direction extended part extends in a front-rear direction of the hybrid vehicle and is secured to the hybrid vehicle. The catalytic part is positioned between a driving battery pack disposed under a floor of a vehicle body of the hybrid vehicle and the internal combustion engine, adjacent to the driving battery pack, and is inclined with respect to the front-rear direction extended part. The joint part rotatably joints the catalytic part to the front-rear direction extended part.

16 Claims, 8 Drawing Sheets

(52) U.S. Cl.
CPC ............ *F01N 13/08* (2013.01); *F01N 13/1805* (2013.01); *F01N 13/1811* (2013.01); *F01N 13/1816* (2013.01); *F01N 13/1822* (2013.01); *F01N 13/1838* (2013.01); *F01N 13/1844* (2013.01); *B60K 2001/0438* (2013.01); *F01N 2260/00* (2013.01); *F01N 2340/00* (2013.01); *F01N 2450/16* (2013.01); *F01N 2470/00* (2013.01); *F01N 2590/00* (2013.01); *Y10S 903/904* (2013.01)

(56) References Cited

U.S. PATENT DOCUMENTS

| | | | | |
|---|---|---|---|---|
| 2008/0164081 | A1* | 7/2008 | Watanabe et al. | 180/65.2 |
| 2008/0185133 | A1* | 8/2008 | Mabuchi et al. | 165/168 |

FOREIGN PATENT DOCUMENTS

| | | | |
|---|---|---|---|
| EP | 1980437 | A1 | 10/2008 |
| JP | 11-178111 | A | 7/1999 |
| JP | 11-245669 | A | 9/1999 |
| JP | 2001-138753 | A | 5/2001 |
| JP | 2002-364473 | A | 12/2002 |
| JP | 2003-118400 | A | 4/2003 |
| JP | 2003-326980 | A | 11/2003 |
| JP | 2004-17808 | A | 1/2004 |
| JP | 2006-9753 | A | 1/2006 |
| JP | 2006-37909 | A | 2/2006 |
| JP | 2007-285151 | A | 11/2007 |
| JP | 2008-260473 | A | 10/2008 |
| JP | 2010-242726 | A | 10/2010 |
| JP | 2011-11647 | A | 1/2011 |
| JP | 2011-143783 | A | 7/2011 |
| JP | 2011-148444 | A | 8/2011 |

* cited by examiner

EXHAUST PIPE STRUCTURE OF HYBRID VEHICLE

CROSS-REFERENCE TO RELATED APPLICATIONS

This application is a Continuation Application of PCT application Ser. No. PCT/JP2012-078373, filed Nov. 1, 2012 and based upon and claiming the benefit of priority from prior Japanese Patent Application No. 2011-242623, filed Nov. 4, 2011, the entire contents of all of which are incorporated herein by reference.

BACKGROUND OF THE INVENTION

1. Field of the Invention

The present invention relates generally to an exhaust pipe structure of a hybrid vehicle with a driving battery pack equipped under the vehicle body.

2. Description of the Related Art

In recent years, a hybrid vehicle utilizing both an internal combustion engine and an electric motor at least one of which is used for driving power of the vehicle is known publically. Such a hybrid vehicle is disclosed in, for example, Jpn. Pat. Appln. KOKAI Publication No. H11-178111 (JP H11-178111-A) and Jpn. Pat. Appln. KOKAI Publication No. 2011-011647 (JP-2011-011647-A).

In such a hybrid vehicle, the internal combustion engine and the electric motor such as a motor generator, etc. are mounted at the front side of the vehicle and the driving battery pack is mounted at the rear side of the vehicle. To suppress fuel consumption as low as possible, use of the internal combustion engine is required to be minimized for driving the vehicle. It is thus desired that the vehicle is driven by the electric motor as much as possible. For this reason, the battery volume is enlarged in a hybrid vehicle, and the size and weight of the driving battery pack are increased.

The driving battery pack requires a protection against damage caused by external stress in case of collision with the other object, etc. Especially, since a catalytic part on an exhaust pipe is very solid and heated to high temperatures, possible damage caused by the catalytic part interfering with the driving battery pack must be avoided.

The exhaust pipe is connected to the internal combustion engine at the front side of the vehicle and is extended to the rear side of the vehicle passing under the vehicle body. Therein, as disclosed in JP H11-178111-A, the exhaust pipe may be arranged in the vehicle such that the catalytic part on the exhaust pipe does not overlap with the battery pack when being viewed either from the front of the vehicle or from the sides of the vehicle.

However, when efficient purification of exhaust gas from the internal combustion engine is taken into consideration, it is desirable that, as disclosed in JP 2011-011647-A, a three-way catalyst is provided near the exhaust pipe structure so that the three-way catalyst can be heated up by the exhaust gas for better gas reduction performance. Despite such a technical desire, JP 2011-011647-A does not disclose a positional relationship between the driving battery pack and the three-way catalyst or a technique to secure safety therebetween in case of a collision.

In the hybrid vehicle described above, in order to place the three-way catalyst in a position adjacent to the internal combustion engine, it is necessary to dispose the three-way catalyst in a position to overlap with a front wall of the battery pack, that is, a position between the internal combustion engine and the battery pack. However, in such a position, the three-way catalyst will interfere with the battery pack if the vehicle collides head-on with an object, and consequently, the battery pack will be damaged.

BRIEF SUMMARY OF THE INVENTION

Considering this point, the present embodiments provide an exhaust pipe structure of a hybrid vehicle in which a catalyst is disposed near an internal combustion engine while it is prevented from damaging a driving battery pack in case of an accident.

To solve the problem and achieve the object, the exhaust pipe structure of the hybrid vehicle is structured as follows.

According to one embodiment of the present application, an exhaust pipe structure for a hybrid vehicle includes an exhaust pipe which includes bent portions and is connected to an internal combustion engine. The exhaust pipe includes a front-rear direction extended part, a catalytic part, and a joint part. The front-rear direction extended part extends in a front-rear direction of the hybrid vehicle and is secured to the hybrid vehicle. The catalytic part is positioned between a driving battery pack disposed under a floor of a vehicle body of the hybrid vehicle and the internal combustion engine, adjacent to the driving battery pack, and is inclined with respect to the front-rear direction extended part. The joint part rotatably joins the catalytic part to the front-rear direction extended part.

According to the present embodiments, a catalyst part is provided near an internal combustion engine to activate the catalyst promptly for better emission control while the catalyst is prevented from damaging a battery pack even when a vehicle collides head-on with an object.

DETAILED DESCRIPTION OF THE INVENTION

Hereinafter, a structure of a hybrid vehicle 1 using an exhaust pipe structure 15 according to a first embodiment is described with reference to FIGS. 1 to 8.

Figure 1:
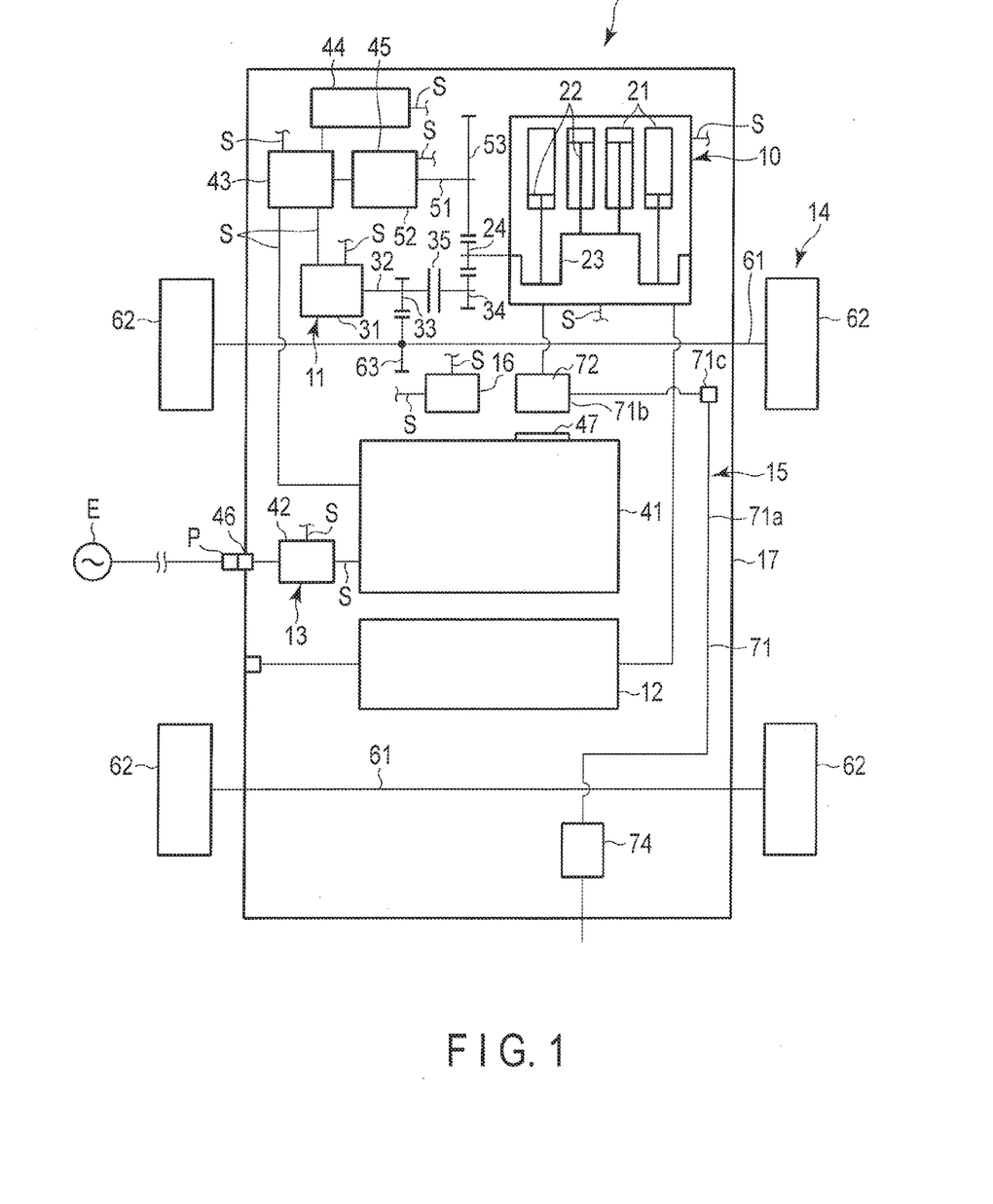
FIG. 1 schematically illustrates a structure of a hybrid vehicle 1 according to a first embodiment.
Figure 2:
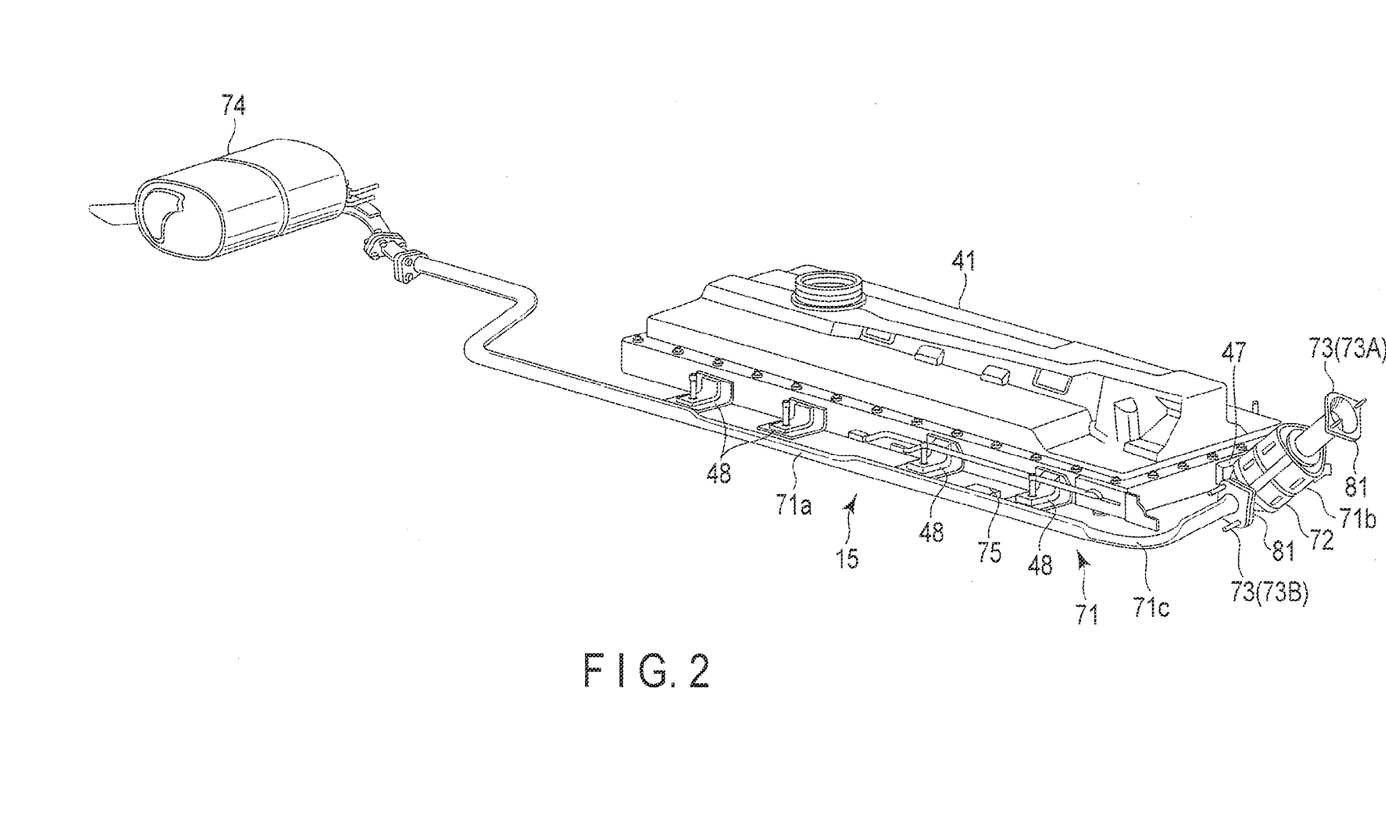
FIG. 2 is a perspective view illustrating a structure of an exhaust pipe structure and a battery pack used in the hybrid vehicle.
Figure 3:
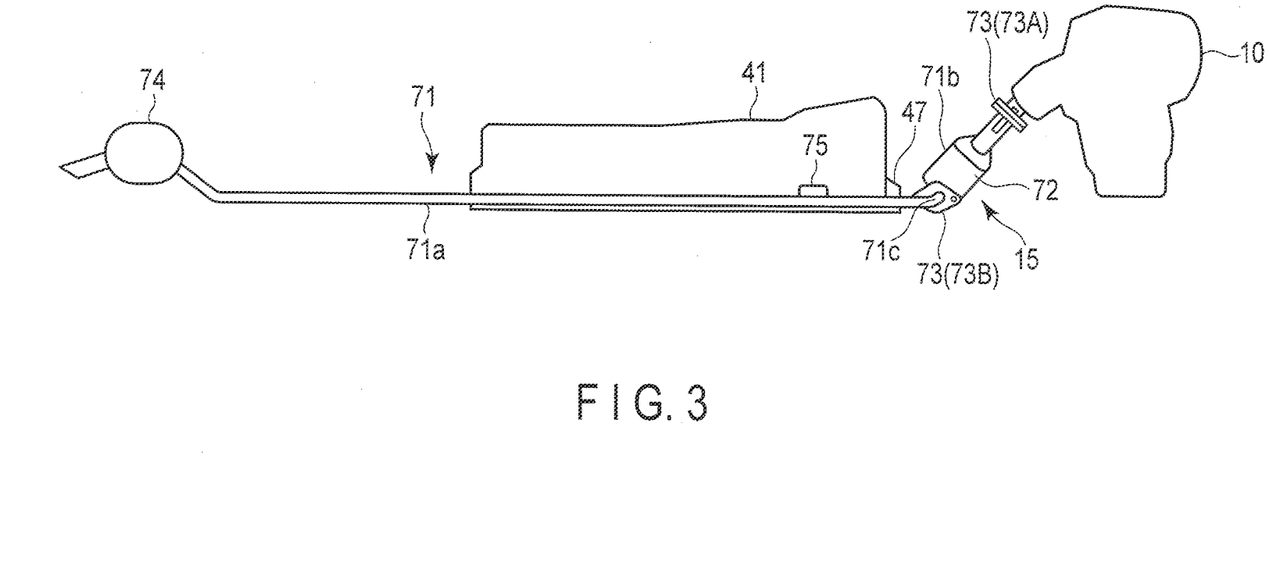
FIG. 3 is a side view schematically illustrating a structure of the exhaust pipe structure and the battery pack.
Figure 4:
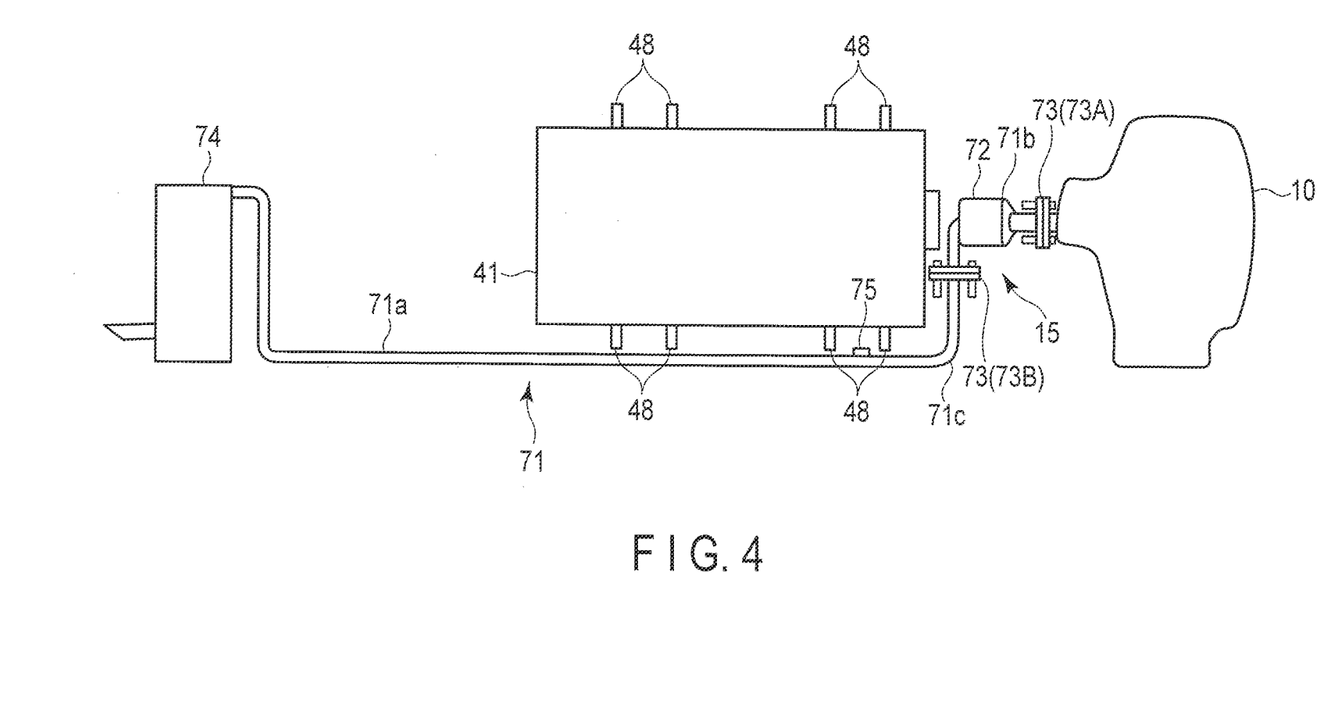
FIG. 4 is a top view schematically illustrating a structure of the exhaust pipe structure and the battery pack.
Figure 5:
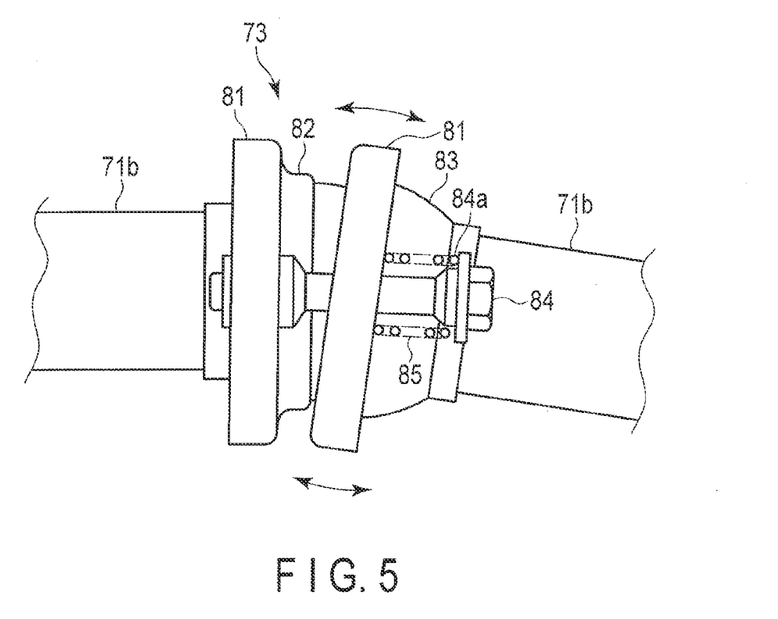
FIG. 5 is a side view illustrating a structure of a spherical joint used in the exhaust pipe structure.
Figure 6:
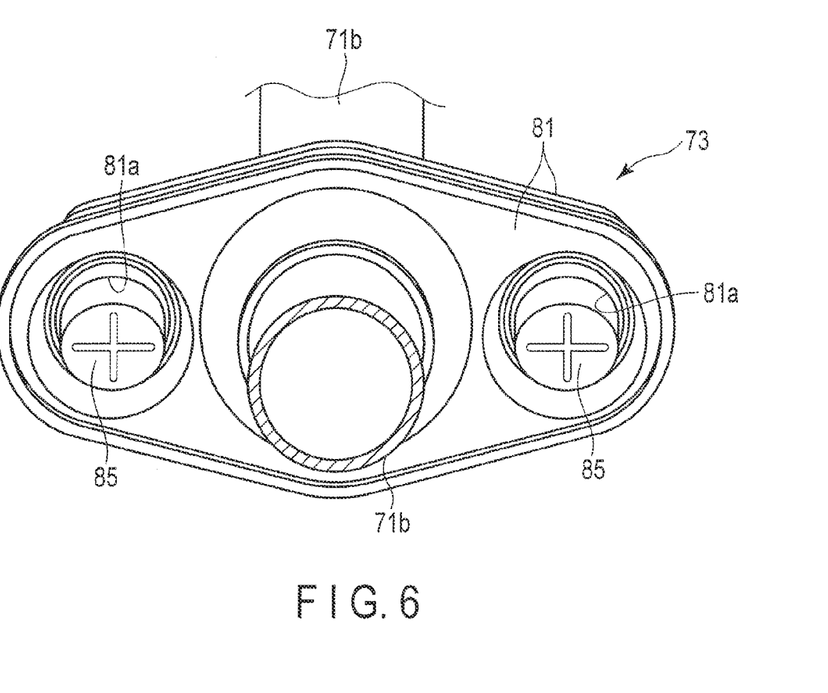
FIG. 6 is a front view illustrating a structure of the spherical joint.
Figure 7:
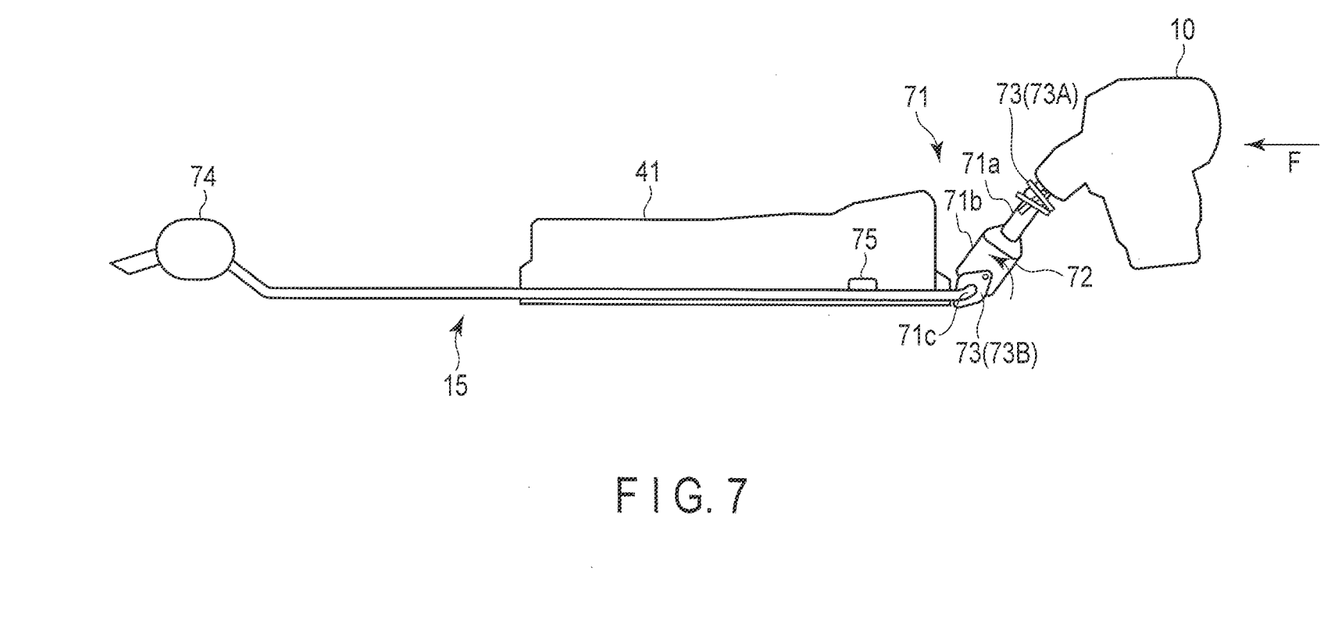
FIG. 7 is a side view schematically illustrating a structure of the exhaust pipe structure and the battery pack.
Figure 8:
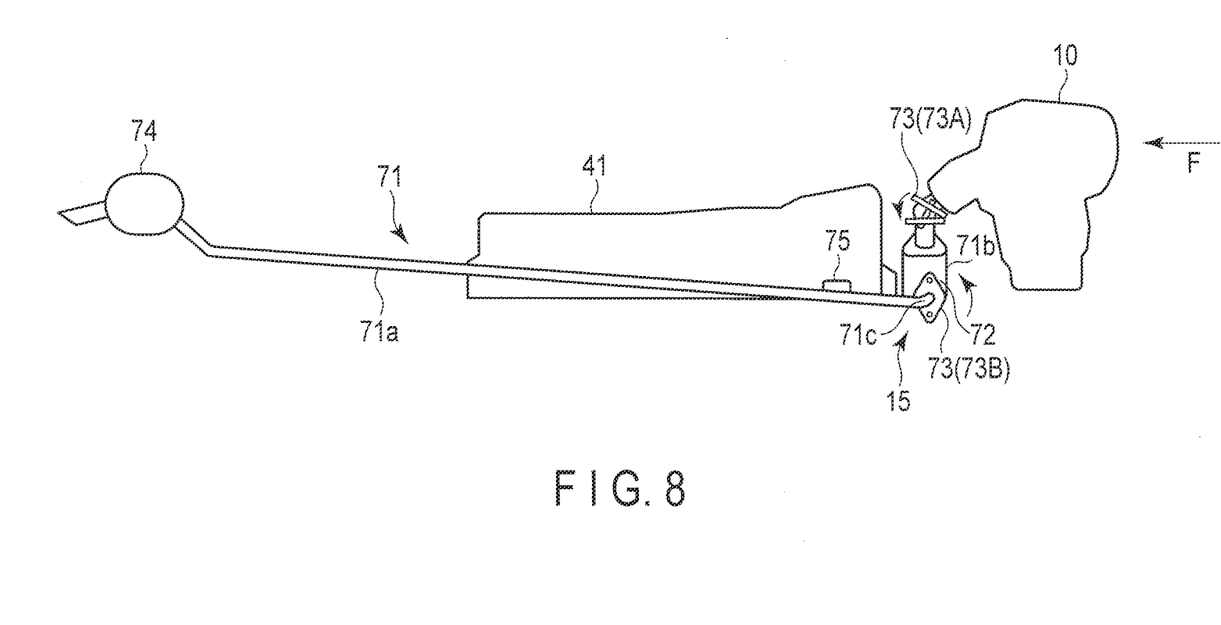
FIG. 8 is a side view schematically illustrating a structure of the exhaust pipe structure and the battery pack.

FIG. 1 schematically illustrates a structure of the hybrid vehicle 1 according to the first embodiment. FIG. 2 is a perspective view illustrating a structure of an exhaust pipe structure 15 and a battery pack 41 used in the hybrid vehicle 1. FIG. 3 is a side view schematically illustrating a structure of the exhaust pipe structure 15 and the battery pack 41. FIG. 4 is a top view schematically illustrating a structure of the exhaust pipe structure 15 and the battery pack 41. FIG. 5 is a side view illustrating a structure of a spherical joint 73 used in the exhaust pipe structure 15. FIG. 6 is a front view illustrating a structure of the spherical joint 73. FIG. 7 is a side view schematically illustrating a structure and a state of the exhaust pipe structure 15 and the battery pack 41, especially, in a case where the hybrid vehicle has collided head-on with an object. FIG. 8 is a side view schematically illustrating a structure and a state of the exhaust pipe structure 15 and the battery pack 41 in a case where the hybrid vehicle has collided head-on with an object.

Note that, in the present embodiments, the driving direction of the hybrid vehicle 1 is referred to as front-rear direction. The direction substantially horizontal to the front-rear direction is referred to as right-left direction, and the direction substantially orthogonal to the front-end direction is referred to as up-down direction.

As shown in FIG. 1, the hybrid vehicle (vehicle) 1 comprises an internal combustion engine 10, driving motor 11, fuel tank 12, battery device 13, drive mechanism 14, exhaust pipe structure 15, and electronic control unit (ECU) 16.

The above-mentioned parts are mounted on a vehicle body 17 of the hybrid vehicle 1. Furthermore, in the hybrid vehicle 1, electronic components such as battery device 13 and ECU 16, etc. are connected to each other via CAN cable S of CAN-c (hereinafter referred to as electric wiring) and the like.

As the internal combustion engine 10, a gasoline engine is used, for example. The internal combustion engine 10 comprises a plurality of cylinders 21 and pistons 22, and a crankshaft 23 configured to reciprocate the pistons 22. The internal combustion engine 10 is connected to the fuel tank 12 configured to supply fuel to a cylinder chamber formed of the cylinders 21 and the pistons 22.

The internal combustion engine 10 comprises first transferring means 24 configured to transfer the rotation of the crankshaft 23. As shown in FIGS. 1, 3, 4, 7 and 8, the internal combustion engine 10 is connected to the exhaust pipe structure 15 and provided with the front side of the vehicle body 17.

The driving motor (electric motor) 11 comprises an electric motor part 31, rotation shaft 32 protruding from the electric motor part 31, second transferring means 33 provided at the middle of the rotation shaft 32, and third transferring means 34 provided at the end of the rotation shaft 32. The driving motor 11 is configured to supply the power from the battery device 13 to the electric motor part 31 to rotate the rotation shaft 32.

The driving motor 11 is configured to idle the rotation shaft 32 if the rotation shaft 32 is separated from the electric motor part 31. The driving motor 11 comprises a clutch 35 which is a friction engagement means to engage/disengage a drive transferring path between the second transferring means 33 and third transferring means 34 in the rotation shaft 32. The second transferring means 33 is connected to the drive mechanism 14. The third transferring means 34 is connected to the first transferring means 24.

The battery device 13 comprises a battery pack (driving battery pack) 41, battery ECU 42, DC/DC converter 43, auxiliary battery 44, generator 45, and external connection port 46 configured to connect to a plug P connected to an external power source E.

The Battery pack 41 is a secondary battery (battery). The battery pack 41 is, for example, a large capacity lithium-ion battery. Specifically, the battery pack 41 includes a plurality of lithium-ion batteries inside. For weight reduction, a resin cover is used to cover a part of or the whole outer rim of the lithium-ion batteries in the battery pack 41. Furthermore, a reinforcing plate 47 which is made of, for example, a metal is provided at a part of the front surface of the battery pack 41, more specifically, at a position to face the internal combustion engine 10 and a catalyst 72 of the exhaust pipe structure 15 described below.

The battery pack 41 is connected to each of the parts, namely, the drive mechanism 14, ECU 16, battery ECU 42, DC/DC converter 43, and external connection port 46 through the electric wiring S and the like. The battery pack 41 supplies electric energy to each of these parts including the driving motor 11 through the electric wiring S.

The battery pack 41 is placed under the floor of the cabin of the vehicle body 17. The shape of the battery pack 41 is substantially a square whose sides are extended along the front-rear direction and right-left direction of the vehicle body 17. The battery pack 41 is situated at substantially the center of the front-rear direction of the vehicle body 17 and at the rearward of and near to the internal combustion engine 10 in the vehicle body 17.

The battery pack 41 includes a plurality of legs 48 at its side surfaces to be secured on, for example, the frame of the vehicle body 17. The battery pack tends to be heavier than the other structural parts of the hybrid vehicle 1, and thus, is situated at substantially the center of and under the floor of the vehicle body 17 for better driving performance.

The battery ECU 42 functions to detect and observe battery conditions such as temperature condition, electric energy condition, and deterioration condition of the battery pack 41 and the auxiliary battery 44.

The DC/DC converter 43 is connected to the battery pack 41, auxiliary battery 44, and generator 45 through the electric wiring S. The auxiliary battery 44 is, for example, a battery of 12V connected to each part of the hybrid vehicle 1.

The generator 45 comprises an input shaft 51, generator part 52 configured to generate power using the rotation of the input shaft 51, and fourth transferring means 53 configured to transfer the rotation of the first transferring means 24 to the input shaft 51. The generator 45 is connected to the ECU 16 through the electric wiring S.

The drive mechanism 14 comprises drive shafts 61 provided at the front side and rear side of the vehicle body 17, drive wheels 62 provided with both sides of the drive shaft 61, and fifth transferring means 63 provided with the drive shaft 61 at the front side of the vehicle body 17. The fifth transferring means 63 is connected to the second transferring means 33 and is configured to transfer the rotation of either the rotation shaft 32 or the drive shaft 61 to the other.

Note that the first transferring means 24, second transferring means 33, third transferring means 34, fifth transferring means 63, crankshaft 23, rotation shaft 32, and drive shaft 61 are configured as a path to transfer the power from at least one of the internal combustion engine 10 and the driving motor 11 to the drive shaft 61.

The exhaust pipe structure 15 comprises an exhaust pipe 71 whose one end is connected to the internal combustion engine 10, catalyst 72 adjacent to the internal combustion engine 10 on the exhaust pipe 71, spherical joints 73 on a joint between the exhaust pipe 71 and the internal combustion engine 10 and on a part of the exhaust pipe 71, and a muffler 74 provided at the end side of the exhaust pipe 71. Furthermore, the exhaust pipe structure 15 comprises a hanger part 75 configured to secure the exhaust pipe 71 to the frame of the vehicle body 17, for example. Hereinafter, the spherical joint 73 on the joint between the exhaust pipe 71 and the internal combustion engine 10 is referred to as first spherical joint 73A, and the spherical joint 73 on a part of the exhaust pipe 73 is referred to as second spherical joint 73B for the clarification sake.

The exhaust pipe 71 comprises an extended part 71a extending to both the front and rear directions of the vehicle, and the catalytic part 71b configured to include the catalyst 72 inside and being provided on a part of the extended part 71a. The exhaust pipe 71 is connected to an outlet port of the exhaust gas at the rear side of the internal combustion engine 10 through the first spherical joint 73A. The exhaust pipe 71 extends in such a manner that the extended part 71a extends from the rear side of the internal combustion engine 10, through the catalytic part 71b and the catalyst 72, to a position where the extended part 71a faces the front surface of the battery pack 41 while inclining downward to the rear side of the vehicle.

The exhaust pipe 71 extends such that the extended part 71a bends at an angle of approximately 90° at the above facing position and extends in the right-left direction of the vehicle body 17 along the front surface of the battery pack 41. In other words, the catalytic part 71b is situated at a position bent with respect to the extended part 71a extending in the right-left direction of the vehicle body 17 to be orthogonal to the right-left direction of the vehicle body 17.

The exhaust pipe 71 includes the second spherical 73B at a part of the extended part 71a extending in the right-left direction of the vehicle body 17 along the battery pack 41, and thereby, the exhaust pipe 71 bends at an angle of approximately 90° to extend to the rear side of the vehicle body 17 along one side surface of the battery pack 41. The 90° bend here forms a bent part 71c in the exhaust pipe 71.

Specifically, the exhaust pipe 71 comprises the extended part 71a including an inclining extended part extending rearward and inclining downward from the rear side of the internal combustion engine 10 through the catalytic part 71b and the catalyst 72, a right-left direction extended part extended in the right-left direction of the vehicle, and a front-rear direction extended part extended from the bent part 71c in the front-rear direction of the vehicle, and the bent part 71c connecting with the right-left direction extended part and the front-rear direction extended part. The exhaust pipe 71 structures a joint part in which the catalytic part 71b is connected to the front-rear direction extended part through the right-left direction extended part and bent part 71c formed by bending a part of the exhaust pipe 71.

Since the exhaust pipe 71 is formed by bending a single pipe, the pipe is deformed at the bent part 71c such that its circular sectional shape turns into substantially an ellipse whose upward-rearward direction is longitudinal. Due to this deformation, the bent part 71c becomes a weak point which is weaker to force in a direction of the twist of the pipe as compared to the other part of the exhaust pipe 71. To deal with this problem, the bent part 71c works as a rotation part to rotate the exhaust pipe 71 when the force is applied to the direction of the twist. Here, since the bent part 71c is formed by bending a part of a single pipe suitably, the exhaust pipe 71 forms a cost-effective rotation part Which is integrally formed with the extended part 71a without preparing any other rotation part separately.

Furthermore, the exhaust pipe 71 extending along the side surface of the battery pack 41 bends at a certain point to extend the extended part 71a to the center part of the rear surface of the battery pack 41. The exhaust pipe 71 then bends at the center part to extend the extended part 71a rearward in the vehicle body 17. The muffler 74 is situated at a middle part of the extended part 71a extending rearward in the vehicle body 17, and a part projecting from the muffler 74 is situated at the rear end of the vehicle body 17.

The catalyst 72 is a three-way catalyst for exhaust gas purification, for example. The catalyst 72 is formed to reduce exhaust gas components from the internal combustion engine such as hydrocarbon (HC), carbon monoxide (CO), and nitrogen oxide (NOx) by rare-earth elements such as platinum, palladium, and rhodium. Since the catalyst 72 is a three-way catalyst, the reduction performance decreases at a normal temperature, and the reduction performance is almost zero immediately after the engine is started from a dead-cold state. Therefore, the catalyst 72 is disposed inside the catalytic part which is situated in the vicinity of the exhaust port of the internal combustion engine 10. Using the heat of exhaust gas, the temperature of the catalyst 72 is raised quickly to improve the speed of reduction performance.

Specifically, the catalyst 72 is disposed between the internal combustion engine 10 and the battery pack 41 inside the exhaust pipe 71 to face the reinforcing plate 47 of the battery pack 41 and is connected to the internal combustion engine 10 through a part of the exhaust pipe 71 and the first spherical joint 73A. That is, the catalyst 72 is disposed to face the battery pack 41 inclining downward.

The catalyst 72 is in the catalytic part which is a part of the exhaust pipe 71 substantially cylindrical and wider than the other parts with a honeycomb structure supporting member adhered to the inside of the pipe in which the above-mentioned rare-earth elements are applied. Note that the exhaust pipe 71 and the catalyst 72 incline from the internal combustion engine 10 toward the battery pack 41 within a range of angles from 35° to 55°, and more preferably, at 45° with respect to a horizontal plane. Here, the horizontal plane stands for a horizontal direction which is substantially parallel with the front-rear direction of the vehicle. Furthermore, the angle with respect to the horizontal plane stands for an angle inclining with respect to a horizontal direction in a case where the front-rear direction of the vehicle and the horizontal direction (horizontal plane) are substantially in parallel.

The spherical joint 73 is configured to join a part of the exhaust pipe 71 to the other part thereof and also to join the exhaust pipe 71 to the other structural parts. The spherical joint 73 is movable to absorb the movement and oscillation of the exhaust pipe 71 and the internal combustion engine 10. As shown in FIGS. 2 to 6, the spherical joint 73 comprises a pair of flanges 81, spherical seal portion 82 provided with one flange 81, and spherical sealed portion 83 provided with the other flange 81 and configured to dent in a shape of the outer form of the spherical seal 82 to slide with the spherical seal 82 and seal a sliding surface.

Furthermore, the spherical joint 73 connects the pair of flanges 81 to each other and comprises a pair of fixing members 84 configured to separate a part of the flanges 81 and pressing members 85 configured to press one of the flanges 81 against the other flange 81.

The flanges 81 have through holes 81a through which the fixing members 84 are passed and whose internal diameter is slightly larger than the external diameter of the fixing member 84 or is formed as an ellipse. That is, the flanges 81 are secured integrally by the fixing members 84 passing through the through holes 81a and pressing members 85 in a direction orthogonal to a direction of the axis of the fixing members 84. Furthermore, the pair of flanges 81 is formed to incline to be distant from/close to each other as shown in FIG. 5.

Each of the spherical seal 82 and the Spherical sealed portion 83 has an opening configured to form a current path from the exhaust pipe 71 at its center part. The fixing members 84 are inserted in the through holes 81a and seats 84a configured to support the pressing members 85 are provided at the ends of the fixing members 84. Here, two fixing members 84 are provided on a straight line parallel to the center of the flanges 81. In other words, a pair of fixing members 84 is provided on the flanges 81 such that the two points linking the fixing members 84 one another passes through the center of the flanges 81.

Each of the pressing members 85 is a coil spring whose one end is supported by the seat 84a and whose other end is supported by the main surface of the flange 81 such that the pair of flanges is pressed in the direction closing to each other. In the spherical joint 73 structured as above, the pair of the flanges 81 is inclinable toward an optional direction when, around a straight line passing the center of each through hole 81a, a part of each flange 81 goes distant from each other and an opposite part of each flange 81 provided at the side symmetrical with respect to the part comes close to each other.

The first spherical joint 73A is situated between the exhaust pipe 71 and the internal combustion engine 10 in such a manner that the straight line connecting the fixing members 84 is laid along the right-left direction of the vehicle body 17. Furthermore, the first spherical joint 73 is situated in such a manner that the surface direction of the flanges 81 be orthogonal to the inclining angle of the inclined catalyst 72. When the internal combustion engine 10 and the exhaust pipe 71 extending from the internal combustion engine 10 to obliquely rearward and downward direction are moved in up-down direction, in other words, when the exhaust pipe 71 moves up and down and the internal combustion engine 10 rolls front and rear, the oscillation therefrom can be absorbed by the pair of flanges 81 which swings to be distant from/close to each other.

The second spherical joint 73B is situated at a part of the exhaust pipe 71 facing the front surface of the battery pack 41 in such a manner that the straight line connecting the fixing members is laid along the front-rear direction of the vehicle body. When the exhaust pipe 71 moves (oscillates) up and down, the movement (oscillation) therefrom can be absorbed by the pair of flanges 81 which swings to be distant from/close to each other.

The hanger part 75 is disposed on the exhaust pipe 71 at a position facing the side surface of the battery pack 41. Since the hanger part 75 is secured to the frame of the vehicle body 17, the hanger part 75 supports the exhaust pipe 71. The hanger part 75 supports, for example, the front-rear direction extended part of the extended part 71a.

The ECU 16 is connected to each structural part through the electric wiring S. The ECU 16 is configured to transmit/receive various kinds of information from/to each structural part and to manage and control each structural part. Furthermore, the ECU 16 is configured to engage/disengage the clutch 35 to drive either the internal combustion engine 10 or the driving motor 11 for creating the driving force.

With such a mechanism, the hybrid vehicle 1 drives using the internal combustion engine 10 and the driving motor 11 and discharges combustion gas from the internal combustion engine 10 through the exhaust pipe structure 15.

Here, the catalyst 72 treats the exhaust gas while being heated to a high temperature by the heat generated from the internal combustion engine 10. The exhaust gas treated by the catalyst 72 passes through the exhaust pipe 71 and the muffler 74 to be discharged.

Now, described is a case where the hybrid vehicle 1 collides head-on with an object in front of the vehicle body 17 with reference to FIGS. 3, 7 and 8.

FIG. 3 shows the hybrid vehicle 1 driving normally, and if the hybrid vehicle 1 collides head-on with an object in front of the vehicle body 17, rearward force indicated by arrow F shown in FIG. 7 is applied to the internal combustion engine 10 and the internal combustion engine 10 is moved rearward. When the internal combustion engine 10 is moved rearward, the first spherical joint 73A absorbs a part of the force applied from the front of the vehicle body 17 with the flanges 81 whose upper side portions are distant from each other and whose lower side portions are close to each other around the straight line connecting the fixing members 84.

Note that the exhaust pipe 71 disposed along the side surface of the battery pack 41 is secured to the vehicle body 17 by the hanger part 75, and thus, the rearward movement to the exhaust pipe 75 is restricted by the hanger part 75.

The exhaust pipe 71 and the catalyst 72 disposed rearward and downward the internal combustion engine 10 are moved in a direction to be close to the battery pack 41 around the exhaust pipe 71 laid along the front surface of the battery pack 41. In other words, the exhaust pipe 71 and the catalyst 72 are rotated rearward the vehicle. Due to this movement, a part of the exhaust pipe 71 laid along the front surface of the battery pack 41 is twisted to rotate around the bent part 71c. Thus, the second spherical joint 73B rotates in accordance with the twist of the exhaust pipe 71 and the straight line between the two points linking the fixing members 84 of the second spherical joint 73B is inclined with respect to the front-rear direction.

As the collision further moves the internal combustion engine 10 rearward, the exhaust pipe 71 connected to the internal combustion engine 10 rotates and the exhaust pipe 71 connected to the internal combustion engine 10 and the catalyst 72 are positioned substantially along the up-down direction as shown in FIG. 8. Furthermore, the exhaust pipe 71 laid along the front surface of the battery pack 41 is further twisted and rotated while moving lower, and the exhaust pipe 71 at the side surface of the battery pack 41 is rotated in such a manner that the front side goes down and the rear side goes up around the hanger part 75. Due to the rotation of the exhaust pipe 71 laid along the front surface of the battery pack 41, the second spherical joint 73B is rotated as well, and the straight line between the two points linking the fixing members 84 of the second spherical joint 73B is located along the up-down direction.

By the transformation of the exhaust pipe structure 15 due to the dislocation of the internal combustion engine 10, the straight line connecting the fixing members 84 of the spherical joint 73A is positioned along the right-left direction while the straight line connecting the fixing members 84 of the second spherical joint 73A is positioned along the up-down direction. Thus, the first spherical joint 73A and the second spherical joint 73B can absorb the front and rear movements of the exhaust pipe 71 and the catalyst 72 in the vehicle body 17. Since the first spherical joint 73A and the second spherical joint 73B absorb the movements of the exhaust pipe 71 and the catalyst 72, the impact and pressure of the catalyst 72 to the reinforcing plate 47 can be reduced.

The reinforcing plate 47 receives the catalyst 72 of which impact and pressure due to the collision have been reduced, and damage to the battery pack 41 by the catalyst 72 can be prevented.

In the hybrid vehicle 1 with the exhaust pipe structure 15 structured as above, the exhaust pipe 71 connected to the internal combustion engine 10 and the catalyst 72 are disposed between the internal combustion engine 10 and the battery pack 41 inclining along the driving direction of the hybrid vehicle 1. Furthermore, the spherical joints 73 are disposed at two points: between the internal combustion, engine 10 and the exhaust pipe 71; and on the exhaust pipe 71 extending along the right-left direction of the vehicle body 17, and are configured to rotate around these two points for absorbing the up and down movements and oscillation.

Furthermore, the exhaust pipe 71 extending along the right-left direction of the vehicle body 17 is bent to extend in the front-rear direction of the vehicle body 17 while a part thereof is secured to the vehicle body 17. With such a structure, even when the vehicle collides head-on with an object and the internal combustion engine 10 moves rearward the driving direction of the vehicle, the exhaust pipe structure 15 creates both a twist based on the bent part 71c of the exhaust pipe 71 and a change of the direction of the rotation of the spherical joint 73. The change enables the exhaust pipe structure 15 to absorb the movement of the catalyst 72 and prevent damage to the battery pack 41 by the catalyst 72 colliding therewith.

Furthermore, the exhaust pipe 71 connected to the internal combustion engine 10 and disposed to incline toward the battery pack 41 and the catalyst 72 on the exhaust pipe 71 are both inclined within a range between 35° and 55°. With this structure, the exhaust pipe structure 15 sufficiently scatters the force applied from the object in the driving direction of the vehicle body 17 obliquely downward while maintaining as large room as possible for moving (rotating) the exhaust pipe 71 and the catalyst 72 safely.

With the exhaust pipe structure 15 as above, potential damage caused by the catalyst 72 to the battery pack 41 can be minimized. Furthermore, since the exhaust pipe structure 15 securely displaces the first spherical, joint 73A and the second spherical joint 73B, the direction of the straight line connecting the two points between the fixing members 84 of each spherical joint 73 can be changed, in other words, the spherical joints 73 can be rotated around the axis of the exhaust pipe 71.

Consequently, even in a case where the catalyst 72 which is heated up to high temperature is crashed into the reinforcing plate 47 of the battery pack 41, the force and impact can be minimized, and damage to the battery pack 41 can be prevented. Thus, potential damage caused by the crash of the battery pack 41 and the catalyst 72 to the vehicle can be prevented.

Furthermore, since the hybrid vehicle 1 with the exhaust pipe structure 15 can prevent damage to the battery pack 41 even in a case where the vehicle collides head-on with an object, the size of the battery pack 41 can be enlarged. Since the battery pack 41 can be enlarged and equipped between the front and rear shafts in the hybrid vehicle 1, cruising range by the electric motor can be enhanced while maintaining the excellent driving performance.

As described above, even if the catalyst 72 is disposed between and close to the internal combustion engine 10 and the battery pack 41, the hybrid vehicle 1 of the present embodiment can absorb movement of and impact from the catalyst 72 by the exhaust pipe structure 15 and prevent damage to the battery pack 41.

Next, a hybrid vehicle 1 according to a second embodiment is described with reference to FIG. 9.

Figure 9:
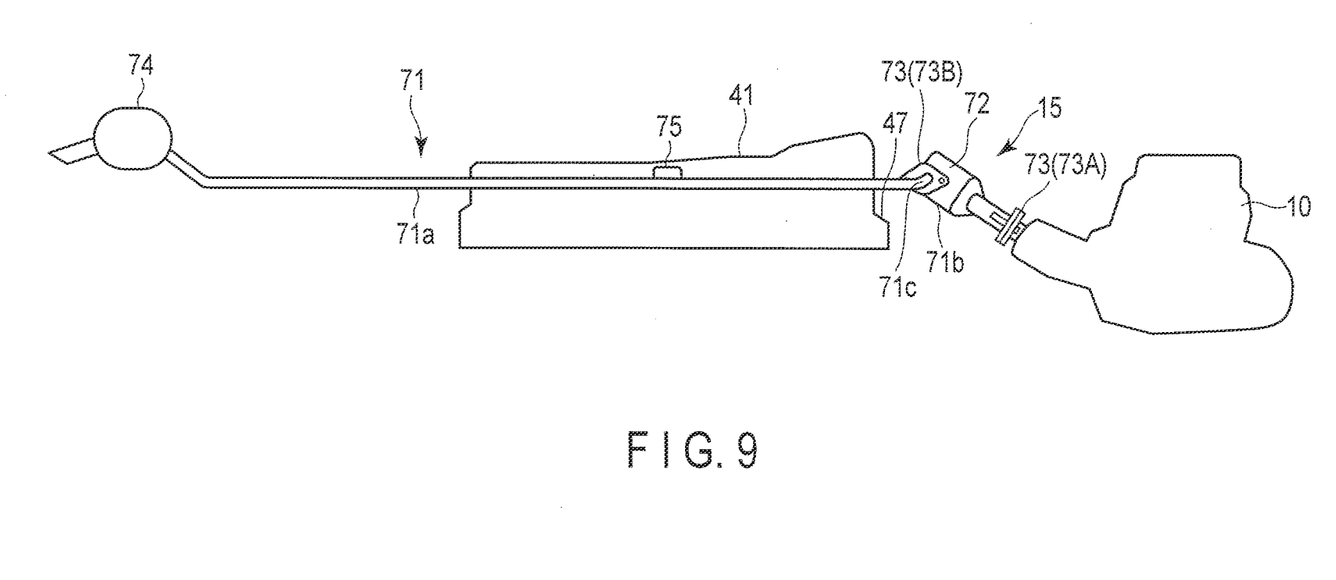
FIG. 9 is a side view schematically illustrating principle structures of a hybrid vehicle according to a second embodiment.

FIG. 9 is a side view schematically illustrating a structure of an internal combustion engine 10, exhaust pipe structure 15, and battery pack 41 used in the hybrid vehicle 1 of the second embodiment. Note that the hybrid vehicle 1 of the second embodiment basically corresponds to the hybrid vehicle 1 of the first embodiment except that a positional relationship between the internal combustion engine 10, exhaust pipe structure 15, and battery pack 41 is altered. Therefore, the structures of the hybrid vehicle 1 of the second embodiment are referred to by the same reference numerals as those of the hybrid vehicle 1 of the first embodiment described above, and their detailed explanation may be omitted.

The hybrid vehicle 1 of the second embodiment comprises the internal combustion engine 10, driving motor 11, fuel tank 12, battery device 13, drive mechanism 14, exhaust pipe structure 15, and electronic control unit (ECU) 16.

The exhaust pipe structure 15 is connected to the internal combustion engine 10 which is situated in the front side of the vehicle body 17.

The exhaust pipe structure 15 comprises an exhaust pipe 71 whose one end is connected to the internal combustion engine 10, catalyst 72 adjacent to the internal combustion engine 10 on the exhaust pipe 71, spherical joints 73 on a joint between the exhaust pipe 71 and the internal combustion engine 10 and on a part of the exhaust pipe 71, and a muffler 74 provided at the end side of the exhaust pipe 71. Furthermore, the exhaust pipe structure 15 comprises a hanger part 75 configured to secure the exhaust pipe 71 to the frame of the vehicle body 17, for example.

The exhaust pipe 71 comprises an extended part 71a extending to both the front and rear directions of the vehicle, and the catalytic part 71b configured to include the catalyst 72 inside and provided on a part of the extended part 71a. The exhaust pipe 71 is connected to an outlet port of the exhaust gas at the rear side of the internal combustion engine 10 through the first spherical joint 73A. The exhaust pipe 71 extends in such a manner that the extended part 71a extends from the rear side of the internal combustion engine 10, through the catalytic part 71b and the catalyst 72, to a position where the extended part 71a faces the from surface of the battery pack 41 while inclining upward to the rear side of the vehicle.

Specifically, the exhaust pipe 71 comprises the extended part 71a including an inclining extended part extending rearward and inclining upward from the rear side of the internal combustion engine 10 through the catalytic part 71b and the catalyst 72, a right-left direction extended part extended the right-left direction of the vehicle, a front-rear direction extended part extended in the front-rear direction of the vehicle from the bent part 71c, and the bent part 71c connecting with the right-left direction extended part and the front-rear direction extended part.

The hanger part 75 is disposed on the exhaust pipe 71 at a position facing the side surface of the battery pack 41. Since the hanger part 75 is secured to the frame of the vehicle body 17, the hanger part 75 supports the exhaust pipe 71. The hanger part 75 supports, for example, the front-rear direction extended part of the extended part 71a.

As with the case of the hybrid vehicle 1 of the first embodiment, if the hybrid vehicle 1 of the present embodiment collides head-on with an object in front of the vehicle body 17, the rearward force applied to the internal combustion engine 10 in the collision itself transforms the spherical joint 73 and the bent part 71c. With this structure, the movement of and impact from the catalyst 72 can be absorbed and potential damage to the battery pack 41 can be prevented in the hybrid vehicle 1.

Note that the present invention is not limited only to the embodiments described above. In the above examples, the hybrid vehicle 1 is driven by the internal combustion engine 10 and the driving motor 11; however, the driving mechanism of the hybrid vehicle 1 is not limited thereto. For example, the hybrid vehicle 1 may be driven by an electric motor 11 whose electricity is generated by the internal combustion engine 10, or the like. That is, as long as the hybrid vehicle 1 utilizes the exhaust pipe structure 15 including the battery pack 41 and the catalyst 72 which is situated between the battery pack 41 and the internal combustion engine 10, the other configuration may be selected optionally.

Furthermore, in the above description, the exhaust pipe 71 is explained that it is movable by three movable portions therein: the bent part 71*c*, first spherical joint 73A, and second spherical joint 73B; however, the movable portions are not limited thereto. For example, the first spherical joint 73A may preferably be employed to absorb the up and down oscillations of the internal combustion engine 10 and the exhaust pipe 71 while, for example, the second spherical joint 73B may be replaced with the other structure which is configured to absorb movements of the exhaust pipe 71 in the front-rear direction of the hybrid vehicle 1 in case of a collision. For example, a movable portion on the exhaust pipe 71 extending along the front surface of the battery pack 41 may be replaced with a weak point which easily transforms (e.g. bends) as compared to the exhaust pipe 71. That is, the movable portion on the exhaust pipe in front of the battery pack 41 may be replaced with any optional movable portion as long as such the exhaust pipe can be moved in the front-rear direction of the vehicle around such a movable portion in front the battery pack 41 in case of a head-on collision of the hybrid vehicle 1.

Furthermore, in the above description, the bent part 71*c* of the exhaust pipe 71 is explained as a movable portion; however, the bent part 71*c* is not limited thereto. For example, a movable portion may not be formed by a bending process of the bent part 71*c* of the exhaust pipe 71 but be formed by dividing the exhaust pipe 71 into a front-rear direction extending pipe and a right-left direction extending pipe and connecting the divided exhaust pipes 71 integrally while maintaining the right-left direction extending pipe rotatable in the direction of twist.

Furthermore, in the above description, the reinforcing plate 47 is provided with the battery pack 41; however, the structure of the battery pack 41 is not limited thereto. For example, the reinforcing plate 47 may not be provided with the battery pack 41. Even if there is not a reinforcing plate 47, the exhaust pipe structure 15 can sufficiently prevent damage to the battery pack 41. In addition, various modifications can be applied to the present invention as long as such modifications fall within the scope and spirit of the invention.

What is claimed is:

1. An exhaust pipe structure for a hybrid vehicle comprising:
    an exhaust pipe including bent portions and connected to an internal combustion engine,
    the exhaust pipe including:
    a front-rear direction extended part extended in a front-rear direction of the hybrid vehicle and secured to the hybrid vehicle;
    a catalytic part positioned between a driving battery pack disposed under a floor of a vehicle body of the hybrid vehicle and the internal combustion engine, adjacent to the driving battery pack, inclined with respect to the front-rear direction extended part;
    a joint part configured to rotatably join the catalytic part to the front-rear direction extended part.
2. The exhaust pipe structure of claim 1, wherein
    the catalytic part is extended from the internal combustion engine inclining downward to the battery pack of the hybrid vehicle.
3. The exhaust pipe structure of claim 2, wherein
    the exhaust pipe is connected to an end at the internal combustion engine side of the catalytic part through a movable portion configured to swing.
4. The exhaust pipe structure of claim 3, wherein
    the movable portion is a spherical joint.
5. The exhaust pipe structure of claim 4, wherein
    the joint part comprises a right-left direction extended part extended in a right-left direction of the hybrid vehicle, and
    the front-rear direction extended part connects to the right-left direction extended part by a bend pipe.
6. The exhaust pipe structure of claim 5, wherein
    the right-left direction extended part is placed between the battery pack and the internal combustion engine, and
    the catalytic part is placed inclining downward from the internal combustion engine to the battery pack of the vehicle.
7. The exhaust pipe structure of claim 6, wherein
    the spherical joints are provided with the both ends of the catalytic part, the catalytic part comprises
    a flange of the spherical joint arranged at the internal combustion engine side to correspond to an angle of downward inclination of the catalytic part to the battery pack, and
    a flange of the spherical joint arranged at the right-left direction extended part material side to be orthogonal to the right-left direction of the hybrid vehicle.
8. The exhaust pipe structure of claim 7, wherein
    the angle of downward inclination is between 35 degree and 55 degree inclusive with respect to the horizontal surface.
9. The exhaust pipe structure of claim 1, further comprising:
    a reinforcing plate on the driving battery pack distant from and facing the catalytic part.
10. The exhaust pipe structure of claim 2, further comprising:
    a reinforcing plate on the driving battery pack distant from and facing the catalytic part.
11. The exhaust pipe structure of claim 3, further comprising:
    a reinforcing plate on the driving battery pack distant from and facing the catalytic part.
12. The exhaust pipe structure of claim 4, further comprising:
    a reinforcing plate on the driving battery pack distant from and facing the catalytic part.
13. The exhaust pipe structure of claim 5, further comprising:
    a reinforcing plate on the driving battery pack distant from and facing the catalytic part.
14. The exhaust pipe structure of claim 6, further comprising:
    a reinforcing plate on the driving battery pack distant from and facing the catalytic part.
15. The exhaust pipe structure of claim 7, further comprising:
    a reinforcing plate on the driving battery pack distant from and facing the catalytic part.
16. The exhaust pipe structure of claim 8, further comprising:
    a reinforcing plate on the driving battery pack distant from and facing the catalytic part.

* * * * *